United States Patent [19]

Steele

[11] Patent Number: 5,429,750
[45] Date of Patent: Jul. 4, 1995

[54] METHOD OF TREATING WASTEWATER SLUDGES FOR PATHOGEN REMOVAL AND VECTOR CONTROL

[75] Inventor: Richard Steele, Arden, N.C.

[73] Assignee: Hazen & Sawyer, P.C., New York, N.Y.

[21] Appl. No.: 83,091

[22] Filed: Jun. 25, 1993

[51] Int. Cl.⁶ .......................... C02F 1/50; C02F 11/14
[52] U.S. Cl. ........................... 210/751; 210/764; 210/768; 422/33
[58] Field of Search ............... 210/751, 764, 710, 768, 210/609, 750; 422/33

[56] References Cited

U.S. PATENT DOCUMENTS

| | | | |
|---|---|---|---|
| 2,230,385 | 2/1941 | Pecker | 210/609 |
| 4,079,003 | 3/1978 | Manchak | 210/764 |
| 4,193,206 | 3/1980 | Maffet | 210/769 |
| 4,270,279 | 6/1981 | Roediger | 210/609 |
| 4,295,972 | 10/1981 | Kamei | 210/750 |
| 4,306,978 | 12/1981 | Wurtz | 210/750 |
| 4,902,431 | 2/1990 | Nicholson et al. | 210/764 |
| 4,988,442 | 1/1991 | Highsmith et al. | 210/609 |
| 4,997,572 | 3/1991 | Wurtz | 210/764 |
| 5,013,458 | 5/1991 | Christy, Sr. et al. | 210/764 |

Primary Examiner—Neil McCarthy
Attorney, Agent, or Firm—Malin, Haley DiMaggio & Crosby

[57] ABSTRACT

A method to remove pathogens from dewatered sludge and to reduce vector attraction that includes the steps of raising the pH 12 of the sludge above 12, subjecting the sludge to low ambient (near zero) pressure and/or elevating the shear pressure on the sludge after the sludge has been treated with a bulking agent to increase stiffness. Exposure to a vacuum enhances pathogen destruction and helps remove odiferous gases for vector control.

6 Claims, 1 Drawing Sheet

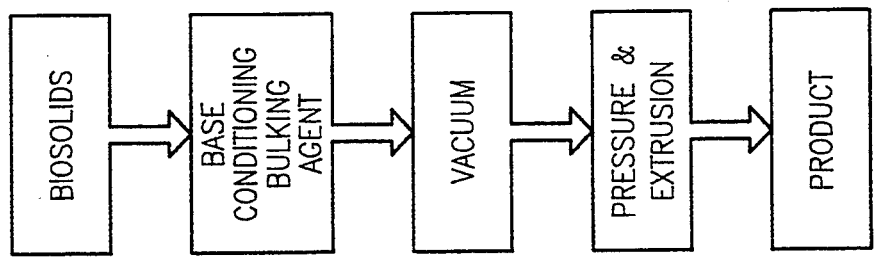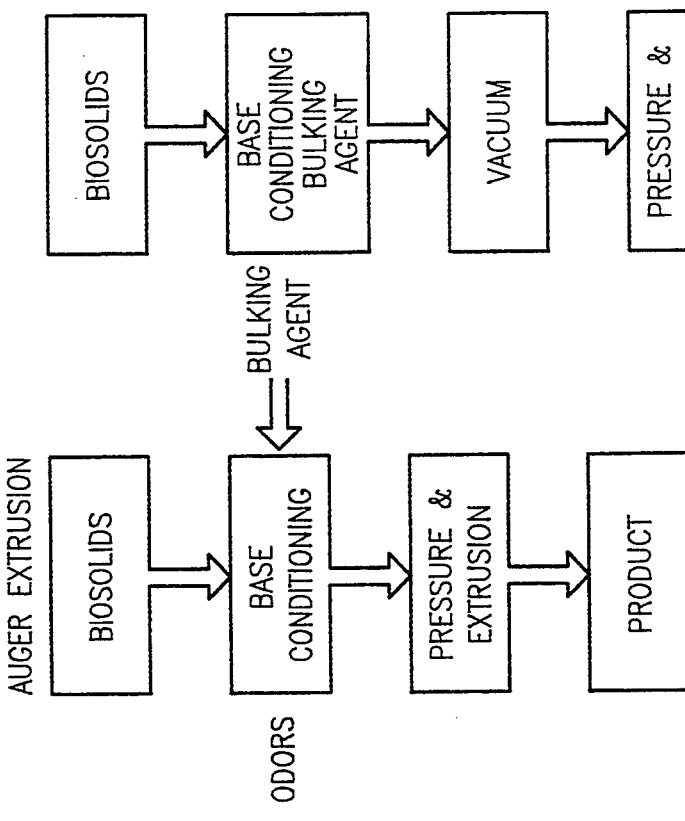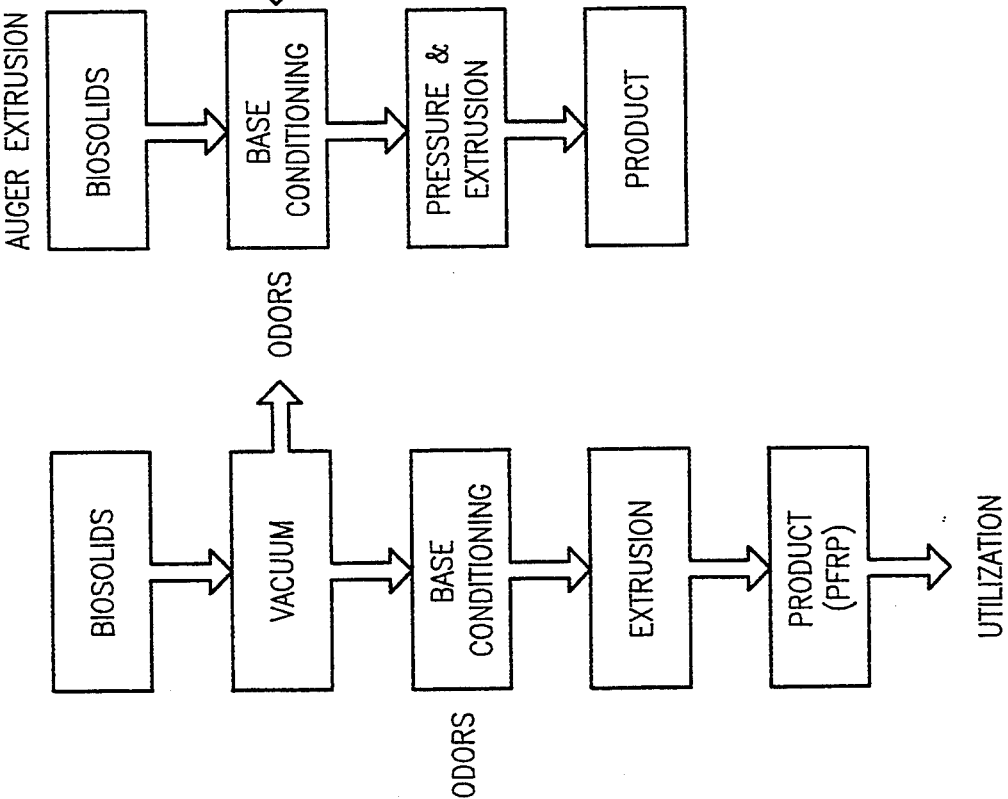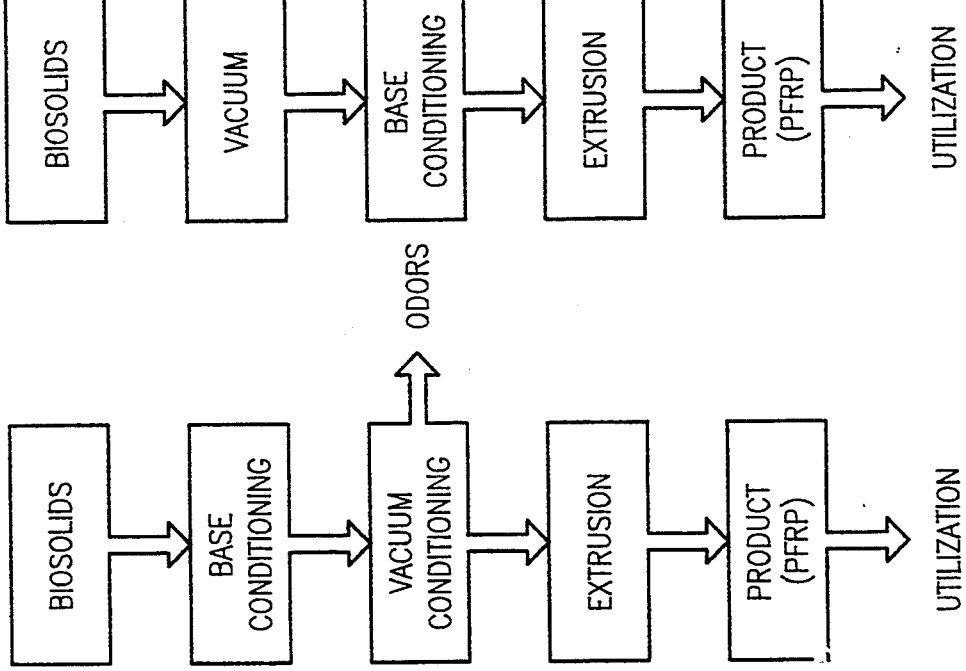

METHOD OF TREATING WASTEWATER SLUDGES FOR PATHOGEN REMOVAL AND VECTOR CONTROL

BACKGROUND OF THE INVENTION

1. Field of the Invention

This invention relates generally to a process for the treatment of wastewater sludges and biosolids in order to achieve the highest classification (Class A) for sludge and sludge products with respect to pathogen removal and vector control and in particular, to an improved process for wastewater treatment that utilizes ambient and internal sludge pressure variation such as vacuum and high pressure extrusion in conjunction with pH conditioning to achieve U.S.E.P.A. Class A sludge quality in conjunction with reducing the effects of putrescible organic compounds in achieving vector attraction reduction.

2. Description of the Prior Art

Pathogens are microbial organisms that cause disease and enter the environment via raw and poorly treated sewage discharges, in wastewater sludge, and from leachates and runoff. Bacteria and viruses are the main health concerns. Protozoans that cause dysentery, parasitic flatworms that cause trichinosis and schistosomiasis, nematodes and cestodes that cause roundworm, threadworm and tapeworm manifestations are also a problem.

Wastewater treatment resulting typically from sewage has a principal bacteria, the *Fescherichia coli*, the fecal coliform found in all human beings; salmonella, responsible for typhoid and paratyphoid fevers, food poisoning, and gastroenteritis; *shigella*, bacteria dysentery; Clostridium food poisoning, *Saphylococcus aureus*, wound infections and food poisoning; *mycobacterium*, tuberculosis; and *leptospira*, Weil's disease and jaundice. Sewage treatment has become mandatory throughout the United States in most areas. This can result in primary treatment, secondary treatment, and tertiary treatment. The sewage treatment separates out solids from water, leaving wastewater sludge. Heavy metals, organics, oil, grease, bacteria, viruses, and protozoans all accumulate in sludge. If the wastewater sludge is to be "reused" in a beneficial manner, it must be conditioned, dewatered, digested, and have pathogens significantly reduced. If it is to be used as fertilizer, it must be treated to destroy common pathogens. The sludge should also be treated to remove odors and reduce or eliminate vector attraction.

One of the most important pathogen removal standards to be met must comply with 40 CFR Part 503, Sewage Sludge Disposal Standards. Class A standards require the reduction of the viable helminth ova (parasitic worm eggs) to below detectable levels. Other pathogens that must be removed to pass the Class A standards are the various types of bacteria and viruses discussed above. Treatment of pathogens such as bacteria and viruses and their elimination are not necessarily achieved with the same environmental agents used to reduce and destroy viable helminth ova. Bacteria and viruses can normally be effectively destroyed by boosting the sludge to a Ph of greater than 12 using alkaline agents such as lime, cement, cement kiln dust (CKD), some fly ashes or similar alkaline or caustic agents. However, helminth ova require different treatment which includes various combinations of higher temperatures and time in order to kill them. The high pH used to control bacteria and viruses may also provide a synergistic benefit in removing helminth ova by reducing the temperature and time required for the destruction of the helminth ova.

Because of the current high volume of sludge resulting from sewage treatment throughout the United States, reconditioning of the sludge is extremely important and must be cost effective. Ideally, achieving a Class A standard for sludge at low cost should greatly solve the problem of sludge removal and reuse.

The highest pathogen removal standards are currently recognized as "Processes to Further Reduce Pathogens" (PFRP) standards and will be equivalently known as the Class A sludges or Class A sludge products. The standards proposed are either a direct measurement of pathogens to levels equal to or less than three salmonella, one plaque-forming virus unit, one protozoan organism, and one helminth ova per gram of volatile suspended solids. A different approach that is less complicated can eliminate the need for direct measuring of pathogens for Class A can be met by raising the temperature of the sludge to 53° C. for five days, 55° C. for three days, or 70° C. for half an hour. The densities of more easily measured indicator organisms must be reduced to levels equal or less than 100 counts per gram of volatile suspended solids for both fecal coliform and fecal streptococci. Treatment technologies that may comply with Class A requirements include composting, thermophilic anaerobic digestion, drying, and heat treatment. Alkaline stabilization methods may also be applicable under the indicator approach if adequate temperatures and contact times can be achieved.

The prior art discloses methods for treating wastewater sludge to achieve E.P.A. standards for PFRP. U.S. Pat. No. 4,781,842, issued to Nicholson on Nov. 1, 1988, describes a method of decontaminating wastewater sludge by raising the pH of the mixture to 12 and above for at least two hours and drying the resulting mixture by an aeration process for one or more days. U.S. Pat. No. 5,013,458, issued to Christy on May 7, 1991, shows a combination of using chemical additives, pH elevation, and pasteurization heat (70° C. for at least 30 minutes for pathogen reduction in waste). U.S. Pat. No. 4,554,002, issued to Nicholson on Nov. 19, 1985, shows a method of beneficiating waste sludge using kiln dust ambient temperature exposure without compacting to produce a disintegratable product which can be applied to land soil. Another U.S. Pat. No. 4,902,431, issued to Nicholson et al. on Feb. 20, 1990, relates to a method of decontaminating wastewater sludge to a level to exceed U.S.E.P.A. PFRP standards using lime or other alkaline materials mixed with the sludge in sufficient quantity to raise the pH of the mixture to 12 and above for a predetermined time and then drying the resultant mixture. Other methods for treating and sterilizing sludge are shown in U.S. Pat. No. 4,270,279, issued to Roediger on Jun. 2, 1981, and to Wurtz in U.S. Pat. No. 4,997,572, issued Mar. 5, 1991.

The present invention provides for a method to treat wastewater sludge cost effectively to achieve the highest pathogen removal standards as recognized in the PFRP and meeting the criteria for reducing the effects of putrescible organic compounds to reduce and control vectors, such as rodents, flies and mosquitos (vector attraction reduction).

SUMMARY OF THE INVENTION

A method for treating wastewater sludge and biosolids to achieve Class A pathogen reduction standards and to reduce vector attraction, comprising the steps of providing a predetermined amount of dewatered sludge and as a first step, raising the sludge pH to above 12 by adding alkaline reagents such lime, cement, cement kiln dust (ckd), fly ashes, or similar caustic agents.

After base conditioning by adjusting the pH, the sludge is subjected to a sufficiently high level of vacuum (within a few inches of Hg relative to absolute zero pressure) in concert with elevating the temperature to induce osmotic stress, causing the helminth ova egg casings and membranes to rupture, rendering the eggs inviable. The amount of time and exposure to the low ambient pressure can be varied with the amount of alkaline material utilized for pH elevation in order to reduce bacterial and viral pathogens and for vector control. Therefore, the combined effect of vacuum and alkaline treatment are mutually reinforcing.

The application of low ambient pressure will be applied continuously during the process, typically by introducing and moving the sludge into an evacuated vessel via a sealing auger arrangement used in deairing pugmills and extruders. The odors release in the vacuum chamber.

In an alternate embodiment, a high pressure extrusion step, is included. First, the shear strength of the sludge will be increased by adding a bulking agent such as ground waste paper, gypsum board, tobacco dust and sawdust, to take the very low shear strength typical of most dewatered sludges and raise it to a point where, under an extruder, extreme pressure can be applied, which amounts to additional frictional resistance, thus raising the temperature within the dewatered sludge. Thus, in this additional step of the process, the sludge is mixed with enough bulking agents to stiffen the sludge to a point where it could be forced through an extrusion die under pressures that are great enough to kill the helminth ova. In addition to the mixture shear strength of the material formed by the dewatered sludge and the bulking agent, the ultimate pressure and heat exerted on the sludge mass is also affected by the feedrate of material through the extrusion system, the revolutions per minute (rpm) of the auger, the design of the auger and liner system and the configuration of the extrusion die. This is utilized with the addition of anhydrous alkaline reagents in order to raise the pH above 12 for viral and bacterial pathogen reduction and for vector control. The addition of the bulking agents and extrusion to high temperatures and pressures can be used alone or in conjunction with a combination of applying extreme vacuum in this stage, either before or after the addition of the bulking agents. The extreme pressure applied via the extrusion can occur only after the bulking agents are added to the sludge.

By applying low ambient pressure greatly below atmospheric pressure during the treatment process, the sludge releases most of the residual ammonia and other rank gases in the sludge for subsequent treatment.

In the alternate embodiment, the stiffened bulk sludge, which is put through an extrusion process to increase its pressure and temperature, becomes quite heated during the extrusion process. At this stage of the extrusion process, the material could be subjected to very low ambient air pressure. Reduced ambient pressure allows many odor-causing constituents in the sludge to volatilize and thus be drawn out. The odiferous gases vented out of the vacuum system could be scrubbed through conventional air scrubbing systems or via any number of unconventional methods like reinjection into the aeration system of many types of aerobic waste water treatment facilities or introduced into the air supply to a boiler or engine. This would result in positive odor control.

The resultant sludge after treatment can be pelletized as part of the treatment process as described herein. Pelletization is useful in that the auger extrusion tends to homogenize the sludge with alkaline reagents to increase the effectiveness of the alkaline materials, the end product is more saleable because it does not resemble sludge, the end product composts better due to the fact that individual pellets or noodles in a compost pile will provide air passages around each pellet, resulting in better odor control, and finally, the pelletized material is easier to handle. Thus, it can be used in fertilizer spreaders or similar standard agricultural equipment.

Pathogen reduction and vector control criteria for Class A sludge can be achieved using a drying action. Drying characteristics are drastically improved when finally ground paper fluff is homogeneously mixed with the sludge. Paper fibers within the mass wick moisture from the center of each sludge lump. Pellets of sludge enhance drying, especially if they are of a uniform cross section for similarity between pellets, allowing drying to be more uniformly accomplished and controlled. Air circulation around the pellets is much better than if the sludge is in one mass. Paper fibers within the material mass allow air to penetrate to the center of each lump or pellet, forming aerobic conditions to develop throughout the sludge mass or pile for better composting and odor control.

It is an object of this invention to provide an improved sewage wastewater sludge pathogen removal method to meet E.P.A. Class A standards for PFRP.

It is another object of this invention to provide improved methods for removing pathogens, reducing vector attraction of dewatered sludge in a cost effective manner to permit widespread additional uses for the sludge product so treated.

And yet another object of this invention is to provide improved methods for treating sludge to make it reusable and cost effective according to the highest requirements of pathogen removal and vector control established by the Environmental Protection Agency.

In accordance with these and other objects which will be apparent hereinafter, the instant invention will now become described with particular reference to the accompanying drawings.

BRIEF DESCRIPTION OF THE DRAWINGS

FIG. 1 shows a method utilized in a step-by-step block diagram of the present invention.

FIG. 2 shows an alternate embodiment of the invention shown in FIG. 1 in a step-by-step block diagram.

FIG. 3 shows additional steps of auger extrusion utilized in the present invention in a block diagram.

FIG. 4 shows an alternate embodiment using a block diagram of the present invention.

DESCRIPTION OF THE PREFERRED EMBODIMENTS

Referring now to the drawings and in particular, FIG. 1, a method is disclosed of treating sludge or biosolids which are wastewater sludge in order to achieve Class A PFRP pathogen removal and at the same time reducing vector attraction.

The first step shows base conditioning of the sludge. The sludge itself may be dewatered sludge having solid contents in the range of 10% to 80%. It is mixed with an appropriate volume of alkaline reagents such as lime as a caustic agent, wherein the base conditioning raises the pH of the sludge to above 12. The amount of lime provided will be from $3\frac{1}{2}$ to $6\frac{1}{2}$ times dosage for sludges in the range from 40% to 20% solids. Once the pH of the sludge is greater than 12, the sludge is subjected to a lowered ambient pressure down to a few inches of Hg relative to absolute zero pressure. During the vacuum conditioning stage, elevated temperature and osmotic stress in concert should cause the helminth ova egg casings and membranes to rupture, rendering the eggs inviable. If the vacuum is effective in destroying the helminth ova, much less lime may be required to reduce pathogens and only dosages sufficient for vector control will be required. During the vacuum conditioning stage, the alkaline sludge mixture is introduced into an evacuated vessel via a sealing auger arrangement. The vacuum can be applied during mixing as is done in vacuum pugmills. After the vacuum conditioning, the product is extruded to exert enough pressure in the extrusion to affect the helminth ova. In order to increase the shear strength during the base conditioning stage, bulking agents such as ground waste paper, gypsum board, or sawdust are added.

Finally, the product, once extruded, may be pelletized, which may be done from the extruder, similar to clay extrusion.

EXAMPLE 1

A sludge in the typical range of 40% to 15% solid is selected. The pH of the sludge is elevated to greater than 12 using a suitable amount of lime to raise the temperature sufficiently to kill virus and bacteria. $3\frac{1}{2}$ to $6\frac{1}{2}$ times as much lime is required for the sludge in the range of 40% to 20% solid, respectively.

In the base conditioning stage, a bulking agent is added such as a 1:1 volume of ground waste paper to increase the shear strength of the sludge.

While the mixing process continues, a vacuum is to be applied to the sludge. The sludge is conveyed into an evacuated vessel via a sealing auger. The vacuum can be applied during mixing if desired. Following the vacuum conditioning in which the ambient pressure around the sludge is reduced to a few inches of Hg above zero, the extrusion of the sludge takes place in an extruder where the pressure is raised to at least 20 psi. Because of the addition of the alkaline and bulking agents, the shear strength of the mixture is greatly increased which stiffens the mixture. At the high pressure and friction, the temperature of the mixture will increase and extrusion high pressures are achieved great enough to kill helminth ova. The shear strength and ultimate extrusion pressure and heat exerted on the sludge mass is affected by the feedrate of the material through the extruder, the rpm of the auger, and the design and configuration of the die.

EXAMPLE 2

Referring now to FIG. 2, a second example of the process is shown where the biosolids/dewatered sludge are between 40% and 20% solid. The vacuum could be applied prior to ultimate base conditioning which includes the addition of bulking agents as described in Example 1. As shown in FIG. 2, the vacuum is applied before the base conditioning which includes addition of lime and a bulking agent for increasing the shear strength of the sludge. Gypsum may be added as the bulking material. After the base conditioning is added, the stiffened sludge is placed into the extrusion process where high temperatures are achieved under pressures greater than 20 psi. Again, the material can be pelletized at the end of the extrusion process if desired.

EXAMPLE 3

FIG. 3 shows biosolids from 40% to 20% solid in which the process is comprised of mixing the sludge with enough bulking agent during the base conditioning that it can be forced through an extrusion die only under pressure great enough to kill helminth ova. Also, in the base conditioning stage, the pH is raised above 12 to remove viral and bacterial pathogens and for vector control. After base conditioning, an extrusion takes place on the sludge which creates great pressure, killing helminth ova and releasing gaseous material to provide vector control. In this case, the pH above 12 controls viral and bacterial pathogens. In this embodiment, no vacuum is provided.

EXAMPLE 4

In FIG. 4, the biosolids are base conditioned with the bulking agent and all mixed together. The bulking agent may be sawdust to stiffen the shear strength of the sludge as discussed above. In addition, the pH of the sludge is raised above 12 with the addition of lime. During the mixing process of the lime and the bulking agent, a vacuum is applied to the sludge and the material being mixed to a few inches above absolute zero of Hg. Odiferous gases are vented out of the vacuum system and scrubbed through conventional air scrubbing systems. After the vacuum process, the sludge is extruded under very high pressure as shown in Example 3.

In the treatment processes described above, it may also be desirable to pelletize the end product for reasons stated above.

One of the methods that can be used to meet pathogen reduction and vector control for Class A sludge is drying, which is greatly improved when finely ground paper fluff is homogeneously mixed with the sludge. The fibers form an overlapping network extending throughout this material. Paper fibers within the mass wick the moisture from the center, especially if the sludge is formed into relatively uniform pellets or granules.

In summary, the present invention greatly enhances pathogen removal, including helminth ova, bacteria and viruses through ambient pressure reduction and high pressure treatment. The low pressure also removes odiferous gases which greatly enhances vector control. The primary objective, which can be easily obtained using the present invention, is to achieve Class A sludge that is cost effective for treating large amounts of sludge. The examples have shown that a range of variables, such as low ambient pressure, high internal pressure of extrusion, bulking agents, and caustic agents for pH control are available. These variables will influence the amount of time required to achieve the proper pathogen removal.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of removing pathogens in wastewater sludge to achieve U.S.E.P.A. Class A pathogen removal and achieving vector attraction reduction comprising:

providing dewatered sludge having a moisture content in the range of 30% to 90%;

mixing a caustic material in said sludge to raise the pH of said sludge above 12;

reducing the ambient atmospheric pressure surrounding said sludge to less than five inches of Hg;

extruding said sludge under high pressure above 20 psi to promote killing helminth ova;

removing said extruded sludge to form a reusable sludge product.

2. The method as in claim 1, wherein said caustic material is selected from the group consisting of lime, cement, cement kiln dust, and fly ashes.

3. The method as in claim 1, wherein said reduced ambient pressure removes odors from said sludge that are vented away from said sludge.

4. A method of removing pathogens from wastewater sludge to achieve U.S.E.P.A. Class A pathogen removal and to achieve vector attraction reduction comprising the steps of:

(a) providing a mass of dewatered sludge having a moisture content in the range of 40% to 90%;

(b) conditioning the sludge mixture by adding a caustic agent to raise the pH above 12;

(c) simultaneously conditioning the sludge mixture by adding a bulking agent selected from the group consisting of ground waste paper, gypsum, tobacco dust and sawdust to increase the shear strength of said sludge;

(d) subjecting said conditioned sludge mixture to high pressure above 20 psi;

(e) extruding said mixture;

(f) removing said extruded mixture to form a reusable sludge product.

5. A method as in claim 4, wherein the caustic agent for raising the pH is lime.

6. A method for removing pathogens and reducing vector attraction for wastewater sludge to achieve U.S.E.P.A. Class A pathogen removal comprising the steps of:

selecting a dewatered sludge between 40% and 80% dry weight;

base conditioning the sludge with a caustic agent to raise the pH to greater than 12;

adding a bulking agent to increase the shear strength of said sludge;

subjecting said sludge to a vacuum to remove odors and to destroy helminth ova eggs;

extruding said sludge under high pressure above 20 psi to promote osmotic stress for killing helminth ova; and removing the sludge from the extruder.

* * * * *